United States Patent [19]

Lochner

[11] 4,005,858
[45] Feb. 1, 1977

[54] DAMPING MEMBER

[76] Inventor: Kaspar Lochner, Karlsburger Str. 7b, 8000 Munich 82, Germany

[22] Filed: Mar. 1, 1976

[21] Appl. No.: 662,812

Related U.S. Application Data

[63] Continuation of Ser. No. 502,762, Sept. 3, 1974, abandoned.

[30] Foreign Application Priority Data

Aug. 31, 1973 Germany .......................... 2343926

[52] U.S. Cl. .............................. 267/136; 267/152; 188/113; 188/268; 267/63 R
[51] Int. Cl.² .......................................... F16F 1/37
[58] Field of Search .......... 267/140, 141, 152, 153, 267/63 R, 137, 116, 139, 136, 35; 293/1, 70, 88, 87, DIG. 2; 188/113, 268; 213/43

[56] References Cited

UNITED STATES PATENTS

| | | | |
|---|---|---|---|
| 3,610,610 | 10/1971 | Chassagne | 267/152 |
| 3,711,080 | 1/1971 | Kendall | 267/116 |
| 3,806,106 | 4/1974 | Hamel et al. | 267/152 |
| 3,890,067 | 6/1975 | Rao | 267/152 |

*Primary Examiner*—James B. Marbert
*Attorney, Agent, or Firm*—Herbert L. Lerner

[57] ABSTRACT

Damping member for absorbing mechanical oscillations and impacts applied in a given direction, comprising a chamber having supporting surfaces at opposite sides thereof, the chamber being formed with walls extending in the given direction and being at least partly elastic, and damping medium received in the chamber and being formed of a tough elastic, lastingly plastic mass.

11 Claims, 4 Drawing Figures

DAMPING MEMBER

This is a continuation of application Ser. No. 502,762, filed Sept. 3, 1974, now abandoned.

The invention relates to a damping member for absorbing mechanical oscillations and impacts which has a chamber with supporting surfaces at opposite sides thereof and in which damping medium is received.

Heretofore known damping members of this general type are formed of rubber-elastic material which, because of the elastic constant of the material thereof is suited only for damping oscillations within a limited range of frequencies.

The resilience in such heretofore known damping members has also been found to be disadvantageous in many cases, it being in fact capable of being varied by suitable shaping or profiling, although it is not able to be satisfactorily eliminated.

In addition, metallic springs have a damping effect which is limited to narrow frequency spectra and also exhibit an undesired strong resilience in many cases.

Hydraulic or pneumatic damping members actually exhibit only a very slight or no resilience, nevertheless, the frequency range in which these members exert their damping effect is relatively narrow. Moreover, such damping members are relatively costly because precision parts are required to determine the damping characteristics thereof and to seal the damping medium.

It is accordingly an object of the invention to provide a damping member of the aforementioned type by relatively simple means and low costs which is effective both for individual impacts as well as for oscillations within a broad frequency spectrum.

With the foregoing and other objects in view, there is provided, in accordance with the invention, a damping member for absorbing mechanical oscillations and impacts applied in a given direction, comprising a chamber having supporting surfaces at opposite sides thereof, the chamber being formed with walls extending in the given direction and being at least partly elastic, and damping medium received in the chamber and being formed of a tough elastic, lastingly plastic mass.

A tough elastic mass having a silicon base, the plastic properties of which are virtually constant within broad temperature limitations is advantageously suited as the damping medium.

In accordance with another feature of the invention, a compressible medium is received in the chamber of the damping member in addition to the lastingly plastic mass. Such a compressible medium may include, for example, an air or other gas cushion or a foamed solid insert, the air or gas cushion or the foamed solid insert being disposed in layers together with the durably plastic mass transversely to the direction in which the mechanical oscillations and impacts are applied to the damping member.

The damping characteristics of a damping member constructed in accordance with the invention, can be influenced or controlled through the dimension of the elastic side walls and the selection of the material therefor in addition to the selection of the plasticity of the damping medium. Therefore, in accordance with a further feature of the invention, the lateral wall of the chamber is formed of a rubber-elastic hollow cylinder, the wall thickness thereof being accommodated to the elasticity of the wall material emloyed for the respective purpose.

In accordance with yet another feature of the invention, the side walls are provided with a shape deviating from purely cylindrical form, for example, by having an annular bead or roll.

A damping member constructed in accordance with the invention of this application provides, in comparison to heretofore known embodiments of such damping member, a damping effect that is uniform over broad frequency ranges and, since the damping member of this invention has no moving parts, it is relatively simple to manufacture and, to a great extent, is prone to disruptions.

For applications wherein an increased resiliency of the damping member is required, there is provided in accordance with a further feature of the invention, the disposition of compressible spring elements transversely to the application of the mechanical oscillations or impacts in addition to the durably plastic mass, the compressible spring elements being supported by the lastingly plastic mass so as to increase the damping action.

In accordance with another feature of the invention, and in order to control the damping action, there is provided in the chamber, in addition to plastic mass, hollow cylinders of stable form at least partly filled with the curably plastic mass and telescopically displaceable with respect to one another, the cylindrical sides of the hollow cylinder being formed with openings through which the plastic mass is passable.

In accordance with a further feature of the invention, the supporting surfaces of the damping member are formed of vibration damping connectors having respective elastic sides thereof facing one another, the walls of the chamber being formed of a rubber-elastic hollow cylinder, the cylindrical wall of which has respective marginal regions to which the vibration damping connectors are connected.

In accordance with another embodiment of the invention of the instant application, only one of the supporting surfaces is formed of a vibration damping connector, the elastic side of which is received in a pot-shaped structure forming the other of the supporting surfaces and receiving therein the durably plastic mass, the pot-shaped structure having a side wall formed with passageway openings for the durably plastic mass and connected to the opposing supporting surfaces through a rubber-elastic hollow cylinder secured at the side wall thereof in the vicinity of the base.

Such damping members are suited especially for additional damping of sounds conducted through a body. Especially high damping qualities are produced in this respect if the elastic part of two vibration damping connectors are of one-piece, i.e. unitary, construction and have a hollow space in which the durably plastic mass is received, the hollow space having a lateral boundary wall or cylinder construction. If especially extreme damping effects are to be produced in the hollow space forming the chamber wall, a recess is formed on the one supporting surface and, on the opposing supporting surface an extension is formed receivable therein, the recess, just as the chamber, being wholly or at least partly filled with lastingly plastic mass.

Other features which are considered as characteristic for the invention are set forth in the appended claims.

Although the invention is illustrated and described herein as embodied in damping member, it is nevertheless not intended to be limited to the details shown, since various modification and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
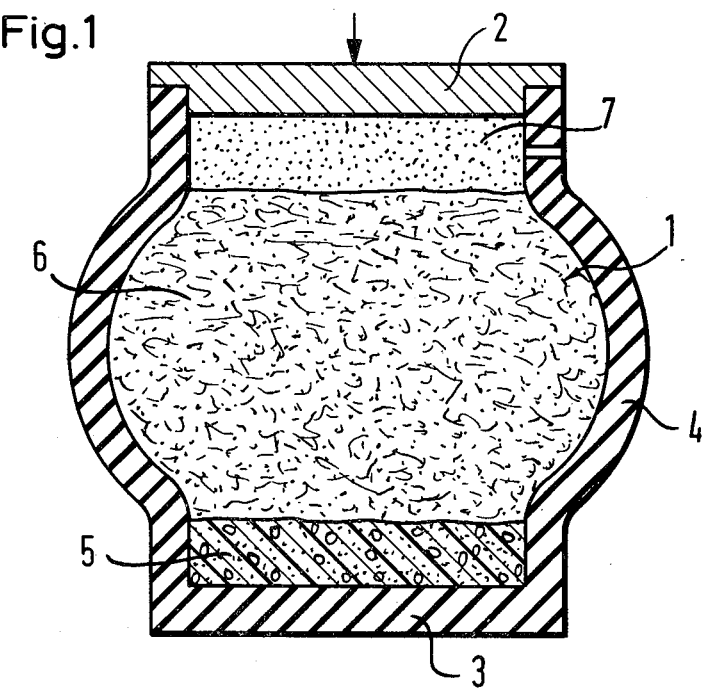
FIG. 1 is a longitudinal sectional view of a damping member constructed in accordance with the invention which has elastic side walls.

Referring now to the drawing and first, particularly to FIG. 1 thereof, there is shown a chamber 1 which is closed at the ends thereof by supporting surfaces 2 and 3, and which is provided with a lateral wall 4 formed of a hollow cylinder of rubber-elastic material that is provided with an annular bead or roll.

In the chamber 1 there are disposed one above the other, a layer 5 of compressible material such as rubber, for example, a layer 6 of curably plastic material, such as formed of a silicon base, for example, and, superimposed thereon a layer 7 again formed of compressible material but, however, of gaseous rather than solid nature such as air or other gas, for example. If a load is applied in the direction of the associated arrow to the damping member, illustrated in FIG. 1, a damping characteristic is produced that is made up of the elasticity of the lateral wall 4, the compressibility of the layers 5 and 7, as well as of the plasticity of the mass 6.

Tests have shown that the degree of damping resulting from these factors is largely constant over great frequency ranges, the damping action being also effective for individual jolts or impacts.

Figure 2:
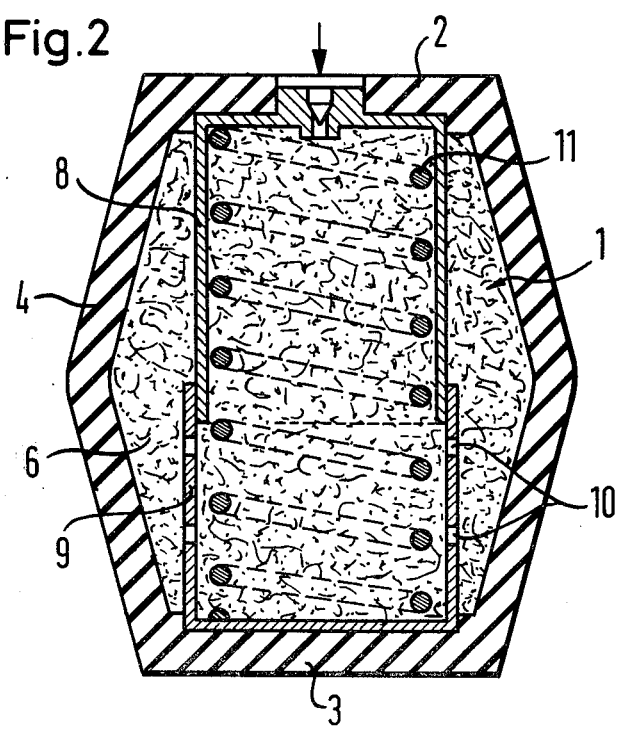
FIG. 2 is a longitudinal sectional view of a damping member, similar to that of FIG. 1 and having an additional spring and a damping telescope.

In the embodiment of the invention of the instant application, shown in FIG. 2, the chamber 1 is also filled with a permanently plastic mass 6 in which two hollow cylinders 8 and 9 are inserted and are displaceable relative to one another in direction of the application of a force resulting from mechanical oscillations and impacts that is applied to the damping member. The hollow cylinders 8 and 9 of the embodiment of FIG. 2 are provided with passageway openings 10 for the durably plastic mass 6, the degree or extent of damping of the damping member of the invention as embodied in the embodiment of FIG. 2 is additionally influenced or controlled through the cross-section of the passageway openings 10. Moreover, within the hollow cylinders 8 and 9, there is a helical spring 11 which reinforces or increases the resilience of the damping member, the restoring displacement being damped by the durably plastic mass 6, the same as the opposing displacement.

Figure 3:
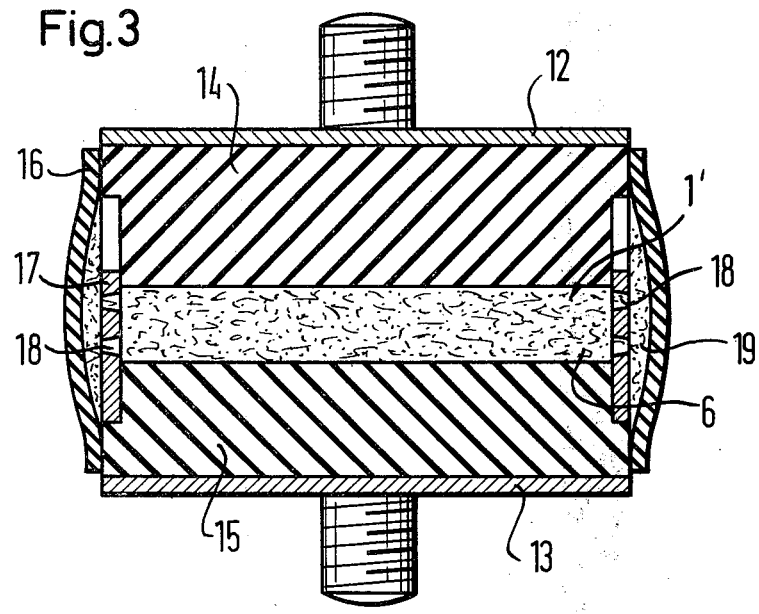
FIG. 3 is a longitudinal sectional view of another embodiment of the damping member of FIGS. 1 and 2 which is constructed with vibration damping connectors.

In the embodiment illustrated in FIG. 3, the supporting surfaces are formed of so-called vibration damping connectors 12 and 13, which have elastic sides 14 and 15, respectively, that are disposed opposite one another and are connected to one another by a rubber-elastic hollow cylinder 16, which forms the lateral wall of a chamber 1' in which the durably plastic mass 6 is received.

An annular diaphragm 17 is disposed between the marginal region of the chamber 1' and the hollow cylinder 16, the annular diaphragm 17 being formed with passageway openings 18 for the lastingly or permanently plastic mass 6.

In the embodiment of FIG. 3, the damping effect results from the elasticity of the elastic sides 14 and 15 of the vibration damping connectors 12 and 13, the dimensioning of the material of the hollow cylinder 16, the diameter and the number of passageway openings 18, as well as the plasticity of the permanently plastic mass 6.

When the damping member is subjected to load, part of the permanently plastic mass 6 enters an annular space or chamber 19 located between the annular diaphragm 17 and the hollow cylinder 16. When the damping member is relieved of stress or load, the part of the plastic mass 6 which had exuded from the chamber 1' through the openings 18 into the annular space 19 is forced back into the chamber 1' through suction effect and through elastic pressure of the hollow cylinder 16.

Figure 4:
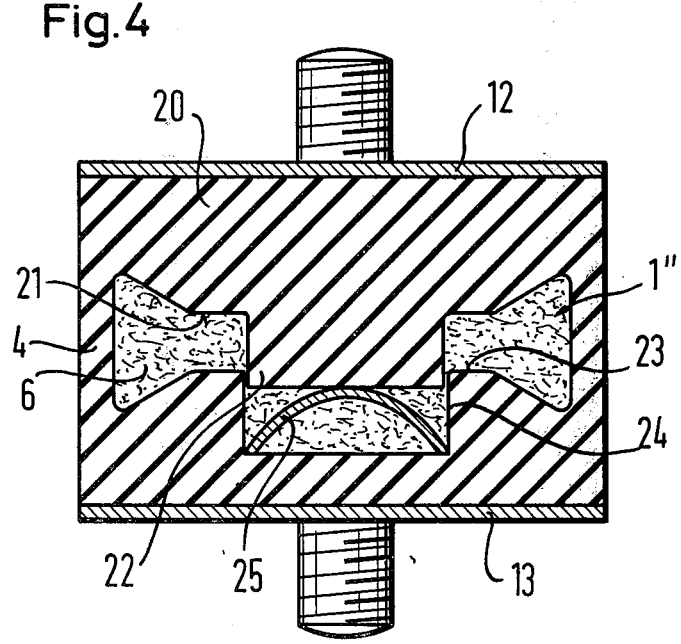
FIG. 4 is a longitudinal sectional view of yet another embodiment of the invention having a damping member constructed of vibration damping connectors with a unitary elastic part.

In the embodiment illustrated in FIG. 4 of the drawings, an elastic part 20 of the vibration damping connectors 12 and 13, is of one-piece or unitary connections wherein a chamber 1' formed therein is filled with the permanently plastic mass 6. A projection 22 extends from one side 21 of the chamber 1" and is received in a recess 24 formed in the opposite side 23 of the chamber 1", the recess 24 being also filled with part of the permanently plastic mass 6.

Reinforcing elasticity of the permanently plastic mass 6 in the recess 24 and engageable by the projection 22 is an additional elastic member, namely, a spring 25.

I claim:

1. Damping member for absorbing mechanical oscillations and impacts applied in a given direction, comprising a chamber having a supporting surface at opposite sides thereof, said chamber being formed with walls extending in the given direction and being at least partly elastic, said partly elastic walls expanding in a direction opposite said given direction upon the application of impacts, damping medium received in said chamber and formed of a tough elastic, lastingly plastic mass, said lastingly plastic mass upon application of said impact moving in the direction toward the expanded area of said partly elastic walls, and a compressible medium received, in addition to said plastic mass, in said chamber, said compressible medium upon application of said impact being compressed, said plastic mass and said compressible medium being disposed in layers extending transversely to the given direction in said chamber, said partly elastic walls on cessation of said impact rebounding from said expanded position, said compressible medium on cessation of said impact returning to a non-compressed state, and said lastingly plastic mass on said rebounding of said elastic walls and said return to a non-compressed state of said compressible medium moving from the direction of said expanded area into said chamber.

2. Damping member according to claim 1 wherein said compressible medium is selected from the group consisting of gases and foamed solids.

3. Damping member according to claim 1 including a spring member enclosed in said plastic mass in said chamber and being compressible in the given direction.

4. Damping member according to claim 1 including in said chamber, in addition to said plastic mass, hollow cylinders of stable form at least partly filled with said plastic mass and telescopically displaceable in the given direction, the cylindrical sides of said hollow cylinders being formed with openings through which said plastic mass is passable.

5. Damping member according to claim 1 wherein said walls extending in the given direction constitute side walls of said chamber and are formed of a rubber-elastic hollow cylinder.

6. Damping member according to claim 5 wherein said chamber side walls are formed with an annular bead.

7. Damping member according to claim 1 wherein said supporting surfaces are formed of vibration damping connectors having respective elastic sides thereof facing one another, said walls of said chamber being formed of a rubber-elastic hollow cylinder, the cylindrical wall of which has respective marginal regions to which said vibration damping connectors are connected.

8. Damping member according to claim 7 wherein said damping mass is received in a space in said chamber between said vibration damping connectors, said space being laterally bounded by an annular diaphragm formed with passageway openings therein.

9. Damping member according to claim 1 comprising a vibration damping connector having an elastic side thereof received in a pot-shaped member defining one of said supporting surfaces, said pot-shaped member receiving said damping medium therein and having a lateral wall formed with passageway openings, said pot-shaped member having a rubber-elastic hollow cylinder secured to said lateral wall thereof at a region of the base of said pot-shaped member, said hollow cylinder being connected to the other of said supporting surfaces located opposite to said one supporting surface.

10. Damping member according to claim 1 wherein said supporting surfaces are formed of vibration damping connectors having a common one-piece elastic portion with sides thereof spaced from and facing one another and a hollow cylindrical part of said one-piece elastic portion connected at marginal edges thereof to said sides of said one-piece elastic portion, said sides and said hollow cylindrical part defining said chamber wherein said damping medium is received.

11. Damping member according to claim 10, wherein one of said sides of said one-piece elastic portion defining said chamber is formed with a recess, and the other of said sides facing said one side is formed with a projection received in said recess.

* * * * *